United States Patent
Kim

[11] Patent Number: 5,881,174
[45] Date of Patent: Mar. 9, 1999

[54] METHOD AND APPARATUS FOR ADAPTIVELY CODING A CONTOUR OF AN OBJECT

[75] Inventor: Jin-Hun Kim, Seoul, Rep. of Korea

[73] Assignee: Daewoo Electronics Co., Ltd., Seoul, Rep. of Korea

[21] Appl. No.: 845,245

[22] Filed: Apr. 21, 1997

[30] Foreign Application Priority Data

Feb. 18, 1997 [KR] Rep. of Korea .................. 97-4873

[51] Int. Cl.⁶ .................................................. G06K 9/36
[52] U.S. Cl. ................................................... 382/236
[58] Field of Search .................................. 382/199, 232, 382/234, 235, 236, 238, 239, 240, 242, 243

[56] References Cited

U.S. PATENT DOCUMENTS

| | | | |
|---|---|---|---|
| 5,151,795 | 9/1992 | Adachi | 382/236 |
| 5,226,093 | 7/1993 | Iwase | 382/236 |
| 5,570,133 | 10/1996 | Yagasaki | 382/236 |
| 5,706,054 | 1/1998 | Hannah | 382/236 |
| 5,706,367 | 1/1998 | Kondo | 382/236 |
| 5,734,737 | 3/1998 | Chang et al. | 382/236 |
| 5,737,449 | 4/1998 | Lee | 382/236 |

*Primary Examiner*—Jose L. Couso
*Attorney, Agent, or Firm*—Pennie & Edmonds LLP

[57] ABSTRACT

A video frame signal containing a plurality of contours is encoded by first granting index data to each of the contours according to a processing order thereof; and then providing current and previous contour information which represents contour image data and index data of a current contour and each of previous contours processed prior to the current contour, respectively. Based on the current contour information and the previous contour information, selection information and a first or a second mode selection signal are produced. The current contour information is inter-coded in response to the first mode selection signal based on the selection information and the previous contour information, or intra-coded under the control of the second mode selection signal. The inter-coded or the intra-coded contour information is rendered as the coded contour information to be transmitted.

20 Claims, 5 Drawing Sheets

METHOD AND APPARATUS FOR ADAPTIVELY CODING A CONTOUR OF AN OBJECT

FIELD OF THE INVENTION

The present invention relates to a method and apparatus for encoding a contour of an object expressed in a video signal; and, more particularly, to a method and apparatus capable of reducing the amount of transmission data through the use of a contour motion estimation technique.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of the digital data therethrough, it is inevitable to compress or reduce the volume of data through the use of various data compression techniques, especially, in the case of such low bit-rate video signal encoders as video-telephone and teleconference system.

One of such techniques for encoding video signals for a low bit-rate encoding system is the so-called object-oriented analysis-synthesis coding technique(see Michael Hotter, "Object-Oriented Analysis-Synthesis Coding Based on Moving Two-Dimensional Objects", *Signal Processing: Image Communication* 2, 409–428 (December, 1990)).

According to the object-oriented analysis-synthesis coding technique, an input video image is divided into objects; and three sets of parameters for defining the motion, contour and pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although there is no loss in the contour information.

To overcome the drawback, therefore, there have been proposed several methods to encode the contour information such as a polygonal approximation and a B-spline approximation. One of the disadvantages in the polygonal approximation is the roughness of the representation of the contour. The B-spline approximation is, on the other hand, capable of representing the contour more precisely; however, it requires a high-order polynomial to reduce the approximation error. The B-spline approximation technique, therefore, may result in an increased overall computational complexity of the video encoder.

One of the techniques introduced to ameliorate such problems associated with the rough representation of the contour and the increased computational complexity in the above approximation approaches is a contour approximation technique employing a discrete sine transform(DST).

Even though it is possible to remedy the rough representation and computational complexity, and somewhat reduce the volume of transmission data through the use of the DST based contour approximation, it still remains desirable to further reduce the volume of transmission data in order to successfully implement a low-bit rate codec system having, e.g., a 64 kb/s transmission channel bandwidth.

SUMMARY OF THE INVENTION

It is, therefore, a primary object of the invention to provide an improved contour encoding method and apparatus which can be beneficially used to further reduce the amount of transmission data by employing a contour motion estimation technique based on a difference between a previous and a current contours.

In accordance with one aspect of the present invention, there is provided a method for encoding a video frame signal containing a plurality of contours on a contour-by-contour basis, each contour being represented by contour image data depicting positions of contour pixels constituting the contour, which comprises the steps of: (a) assigning index data to each of the contours according to a processing order thereof; (b) providing current contour information representing contour image data and index data of a current contour; (c) supplying previous contour information representing contour image data and index data of each of previous contours processed prior to the current contour; (d) producing selection information and a first or a second mode selection signal based on the current contour information and the previous contour information for all of the previous contours; (e) inter-coding, in response to the first mode selection signal, the current contour information based on the selection information; (f) intra-coding, under the control of the second mode selection signal, the current contour information; and (g) rendering the inter-coded contour information or the intra-coded contour information as coded contour information to be transmitted.

In accordance with another aspect of the present invention, there is provided an apparatus for encoding a video frame signal containing a plurality of contours on a contour-by-contour basis, each contour being represented by contour image data depicting positions of contour pixels constituting the contour, which comprises: a designation block for indexing each of the contours according to a processing order thereof to thereby grant index data to each of the contours; a first providing block for outfitting current contour information representing contour image data and index data of a current contour; a second providing block for storing and sequentially supplying previous contour information representing contour image data and index data of each of previous contours processed prior to the current contour; a mode selection block for producing selection information and a mode selection signal based on the current contour information and the previous contour information for all of the previous contours; an inter-coding block for inter-coding the current contour information based on the selection information to thereby generate inter-coded contour information; an intra-coding block for intra-coding the current contour information to thereby produce intra-coded contour information; and a selection block for choosing, in response to the mode selection signal, the inter-coded contour information or the intra-coded contour information as coded contour information to be transmitted.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
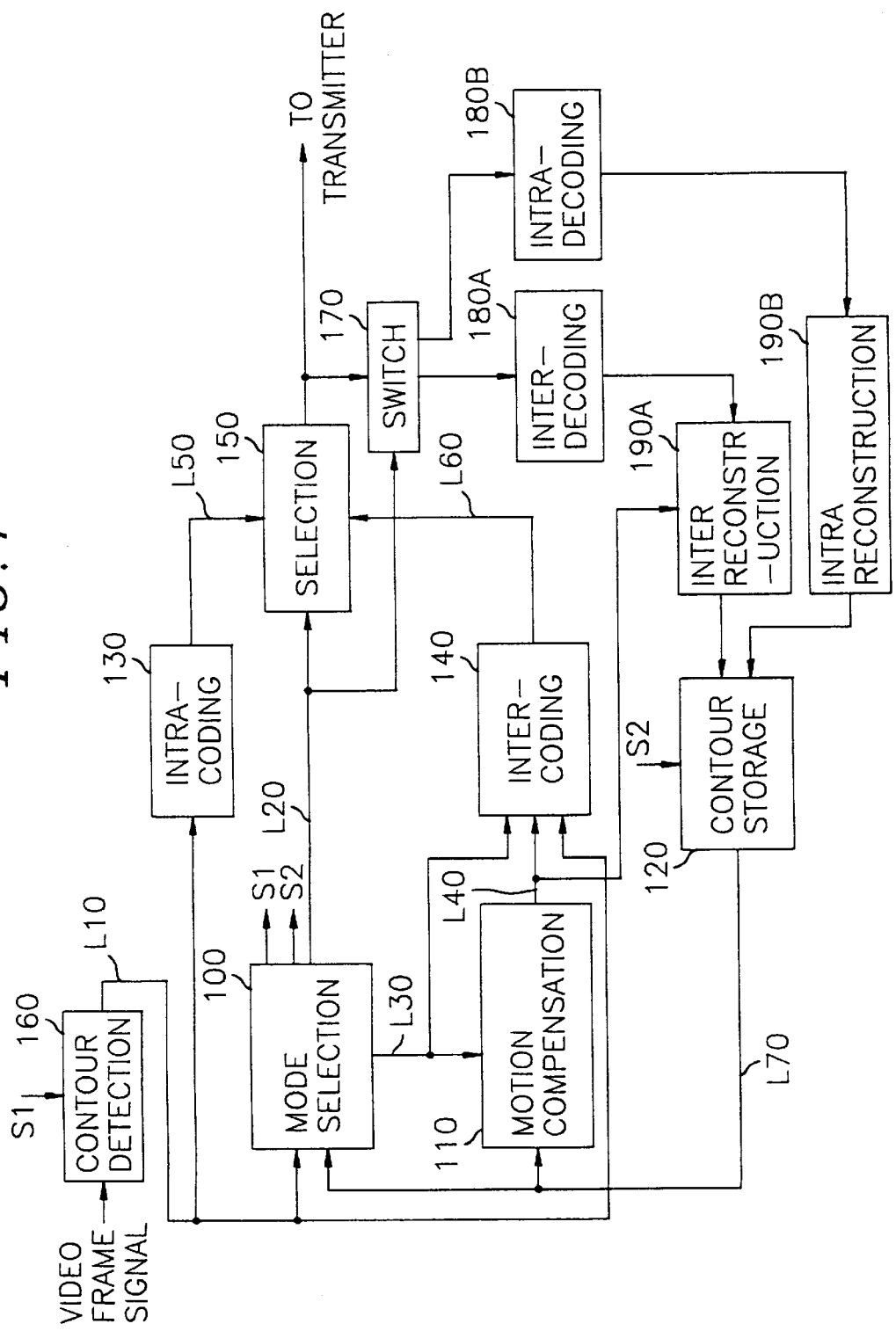
FIG. 1 represents a schematic block diagram of an apparatus for encoding a contour in accordance with the present invention.

Referring to FIG. 1, there is shown a schematic block diagram of an inventive apparatus for encoding a video frame signal containing a plurality of contours on a contour-by-contour basis, wherein each contour is represented by contour image data depicting positions of contour pixels constituting the contour. The video frame signal is provided to a contour detection block 160.

The contour detection block 160 assigns index data to each of the contours included in the video frame signal according to a processing order thereof to thereby output contour information having contour image data and index data for each of the contours. The contour information defining each of the contours is sequentially provided as current contour information to an intra-coding block 130, a mode selection block 100 and an inter-coding block 140 via a line L10 in response to a first control signal S1.

The intra-coding block 130 first encodes the current contour through the use of one of known contour coding techniques such as a chain coding technique and a contour coding technique employing a polygonal approximation and a discrete sine transform(DST), to thereby provide intra-coded contour information onto a line L50.

In the meantime, the mode selection block 100 outputs a first or a second mode selection signal MS1 or MS2 onto a line L20, the first and a second control signals S1 and S2, and selection information onto a line L30 based on the current contour information and previous contour information for all of previous contours, wherein the previous contours have been processed prior to the current contour and stored in a contour storage block 120 which sequentially retrieves, in response to the second control signal S2, previous contour information for each of the previous contours stored therein and outputs it through a line L70.

Figure 2:
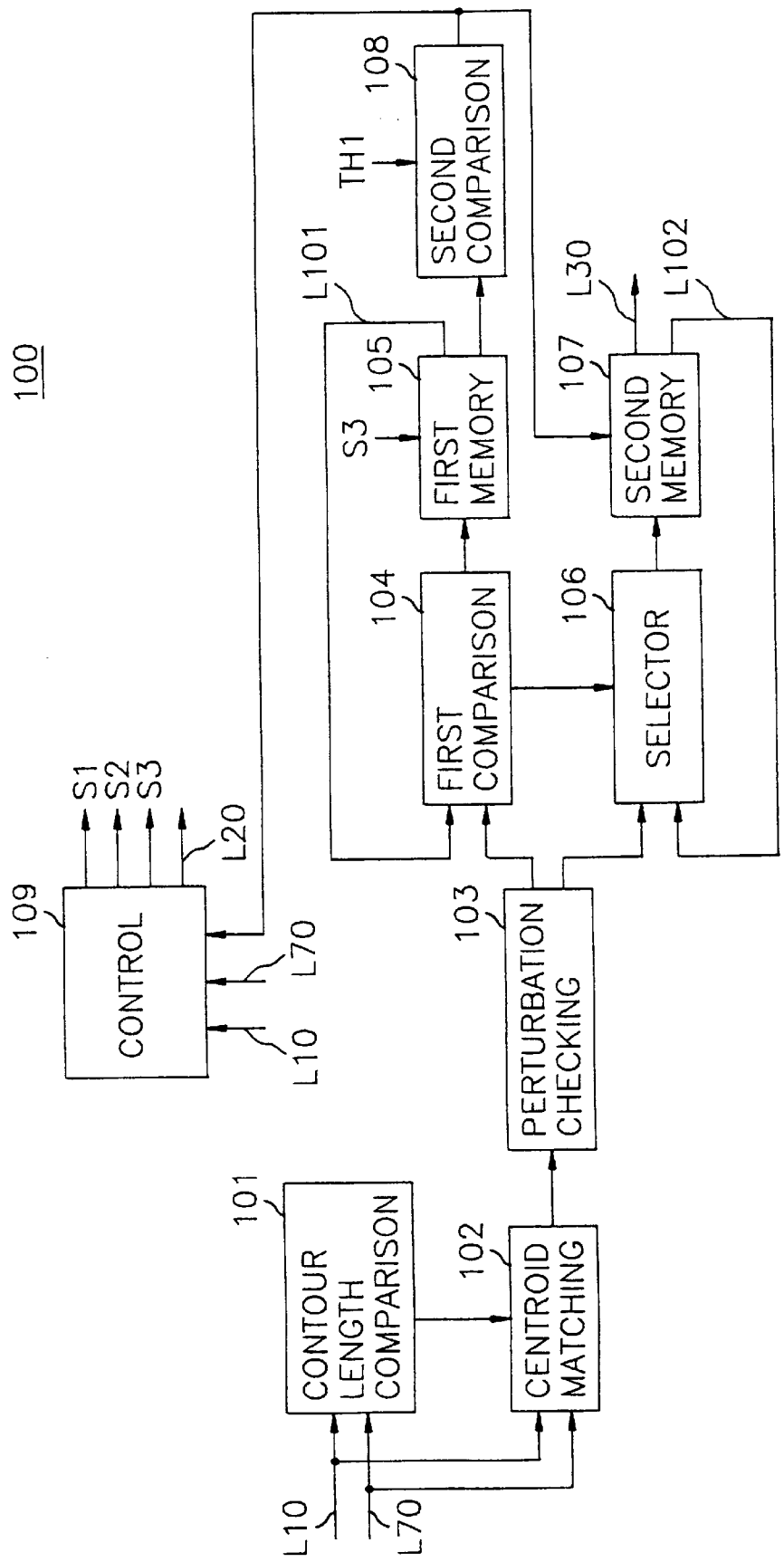
FIG. 2 provides a detailed block diagram of a mode selection block shown in FIG. 1.

There is presented a detailed block diagram of the mode selection block 100 in FIG. 2. The current and the previous contour information fed to the mode selection block 100 via the lines L10 and L70 are supplied to a contour length comparison sector 101 and a centroid matching sector 102.

The contour length comparison sector 101 provides the centroid matching sector 102 with a comparison signal by comparing the length of the current contour with that of the previous contour, wherein a length of a contour is determined, e.g., by the number of contour pixels constituting the contour. That is, the comparison signal is provided if a difference between the lengths of the current and the previous contours is within a range of ±10% of the length of the current contour and, if otherwise, the comparison signal is not coupled.

The operation of the centroid matching sector 102 is achieved, in response to the comparison signal from the contour length comparison sector 101, based on the previous and the current contour information. Once the comparison signal is fed thereto, the sector 102 finds centroids for the current and the previous contours, e.g., by averaging the position coordinates of all the contour pixels on each of the contours based on the previous and the current contour information; computes a candidate displacement denoting a spatial displacement between the centroids of the current and the previous contours; generates a predicted contour by shifting all the contour pixels on the previous contour by the candidate displacement; and provides the candidate displacement and the predicted and the current contour information to a perturbation checking sector 103. On the other hand, if the comparison signal is not coupled to the centroid matching sector 102, the above process can not be carried out.

Based on the predicted and the current contour information and the candidate displacement from the sector 102, the perturbation checking sector 103 detects an optimized contour for the predicted contour by horizontally and vertically shifting the predicted contour along the current contour by more than one-pixel, wherein the optimized contour entails a smallest error value representing a difference between the optimized contour and the current contour, to thereby produce the error value for the optimized contour and an optimized displacement determined by adding the candidate displacement to a spatial displacement between the optimized contour and the current contour.

Figure 4A:
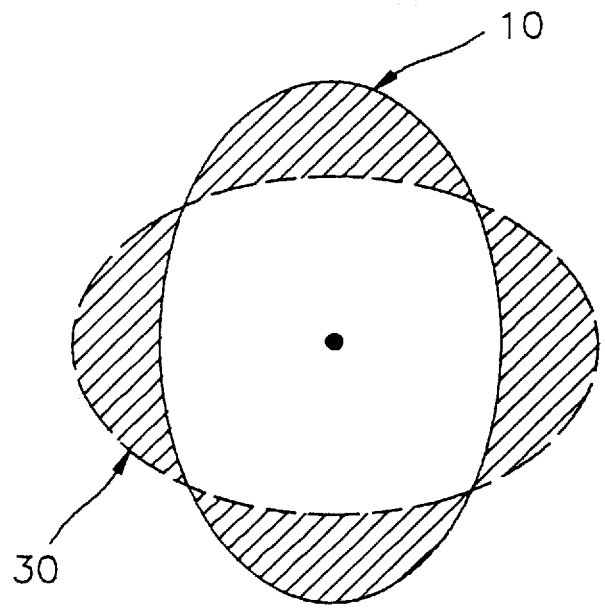
FIGS. 4A and 4B illustrate processes of detecting an error value between two contours in the preferred embodiments of the present invention.
Figure 4B:
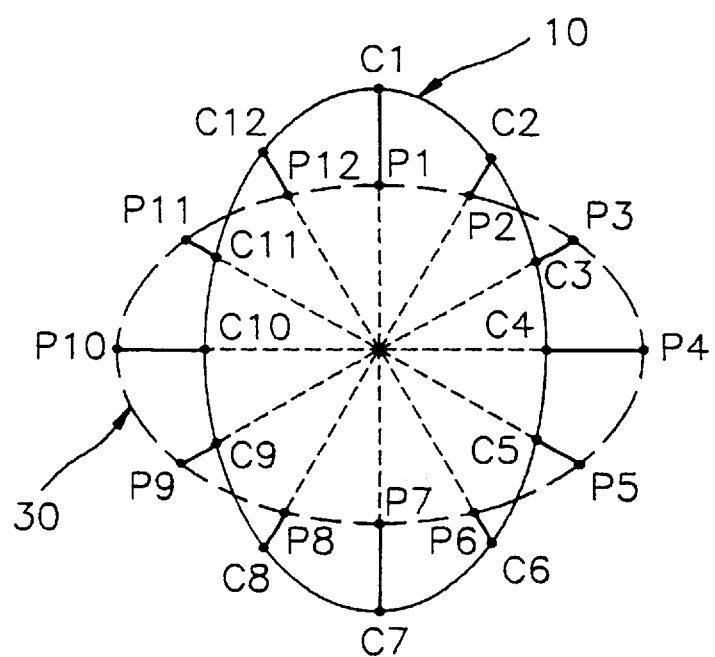

Referring to FIGS. 4A and 4B, there are illustrated processes for detecting the error value of the optimized contour in the preferred embodiments of the present invention.

In accordance with a preferred embodiment of the invention, as shown in FIG. 4A, the error value of the optimized contour is defined as the area of non-overlapped regions, i.e., the shaded regions enclosed by the current contour 10 and the optimized contour 30. In another preferred embodiment of the invention, the error value is represented by the number of pixels residing at the shaded regions in lieu of the area thereof.

Meanwhile, referring to FIG. 4B, the error value of the optimized contour is detected by using the centroid of the current contour 10. First of all, the perturbation checking sector 103 draws from the centroid of the current contour 10 a set of K, e.g., 12, number of radial equiangular lines starting from a predetermined reference line, the magnitude of the angle between two adjacent radial lines being $2\pi/K$ radian, K being an integer larger than 1; detects intersection points of the K number nf radial lines intersecting with the contours 10 and 30, e.g., C1 to C12 on the current contour 10 and P1 to P12 on the optimized contour 30; and calculates a sum of absolute values of displacements between the intersection points on each of the radial lines as the error value.

Referring back to FIG. 2, the error value of the optimized contour is coupled to a first comparison sector 104 as a current error value, and the optimized displacement and the index data of the optimized contour are supplied to a selector 106 as current matching information.

The first comparison sector 104 compares the error value of the optimized contour retrieved from the perturbation checking sector 103 with a previous error value coupled thereto through a line L101 to thereby find a smaller value; transfers the smaller value as a selected error value to a first memory 105; and provides a first or a second selector control signal to the selector 106 based on the result of the above comparison process. For example, the first selector control signal is generated if the error value is smaller than the previous error value and, if otherwise, the second selector control signal is created.

The selector 106 provides a second memory 107 with the current matching information from the perturbation checking sector 103 in response to the first selector control signal, or supplies, under the control of the second selector control signal, previous matching information fed thereto via a line L102 to the second memory 107.

The selected error value retrieved from the first comparison sector 104 is stored at the first memory 105 and concurrently provided onto the line L101 as the previous error value. And also, it is transferred to a second comparison sector 108 in response to a third control signal S3 derived from a control sector 109.

The second comparison sector 108 compares the selected error value from the first memory 105 with a predetermined threshold value TH1 in order to provide the second memory 107 and the control sector 109 with an error comparison signal only if the selected error value is equal to or smaller than TH1.

The second memory 107 stores the selected matching information from the selector 106 and provides it onto the line L102 as the previous matching information at the same time. And, in case the error comparison signal from the second comparison sector 108 is fed to the second memory 107, the matching information stored in the second memory 107 is selected as the selection information.

Therefore, as shown above, the outputs of the perturbation checking sector 103 are stored at the first and the second memories 105 and 107, or discarded according to the comparison result of the first comparison sector 104. In other words, if the error value from the sector 103 is smaller than the previous error value on the line L101, the outputs of the sector 103 are stored in the memories 105 and 107, and, if otherwise, the previous data on the lines 101 and 102 are recoupled to the memories 105 and 107.

The control sector 109 produces control signals based on the current and the previous contour information coupled via the lines L10 and L70, respectively. That is, if it is detected that all of the previous contours, which are stored in the contour storage block 120 and sequentially outputted via the line L70, are processed at the mode selection block 100 by counting the number of the previous contours transferred through the line L70, the first control signal S1 is produced in order to control the contour detection block 160 capable of providing new current contour information onto the line L10 and the third control signal S3 is generated so as to make the first memory 105 deliver the error value stored therein to the second comparison sector 108. And, the second control signal S2 is created after the previous contour information delivered through the line L70 is processed at the sectors 101 and 102 so that the contour storage block 120 provides next previous contour information onto the line L70 in response to the second control signal S2. The first mode selection signal MS1 is provided onto the line L20 if the error comparison signal from the second comparison sector 108 is coupled; and, if otherwise, the second mode selection signal MS2 is coupled onto the line L20.

As afore-mentioned, according to the illustrations in FIG. 2, if the selection process at the mode selection block 100 is performed, in response to the second control signal S2 generated at the control sector 109, for all of the previous contours sequentially transferred from the contour storage block 120 via the line L70, as a result of the above process, one of the previous contours stored in the contour storage block 120 which corresponds to the selection information is selected as an optimum previous contour for the current contour and the selection information of the optimum previous contour is fed to a motion compensation block 110 via the line L30.

Referring back to FIG. 1, the motion compensation block 110 produces a predicted current contour based on the selection information on the line L30. In more detail, the predicted current contour is generated by shifting the optimum previous contour selected from the previous contours stored in the contour storage block 120 by the optimized displacement thereof. The predicted current contour is fed to the intercoding block 140 and an inter reconstruction block 190A via a line L40.

Figure 3:
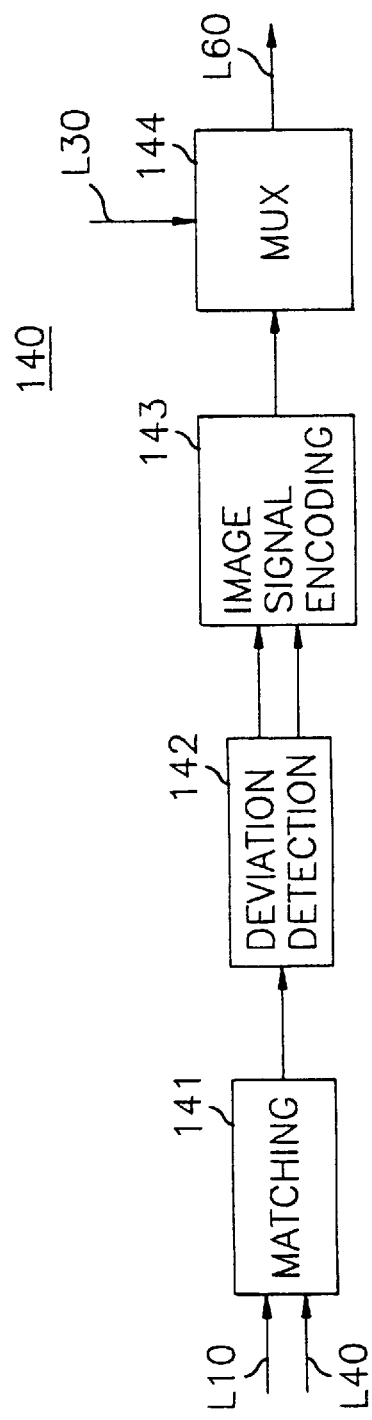
FIG. 3 shows a detailed block diagram of an inter-coding block shown in FIG. 1.

The inter-coding block 140 inter-codes the current contour transferred thereto via the line L10 based on the selection information on the line L30 and the predicted current contour on the line L40. In FIG. 3, there is shown a detailed block diagram of the inter-coding block 140 in accordance with the preferred embodiment of the present invention.

Hereinafter, the operation of the inter-coding block 140 containing a matching sector 141, a deviation detection sector 142, an image signal encoding sector 143, and a multiplexer 144 will be illustrated with respect to FIG. 3.

Figure 5:
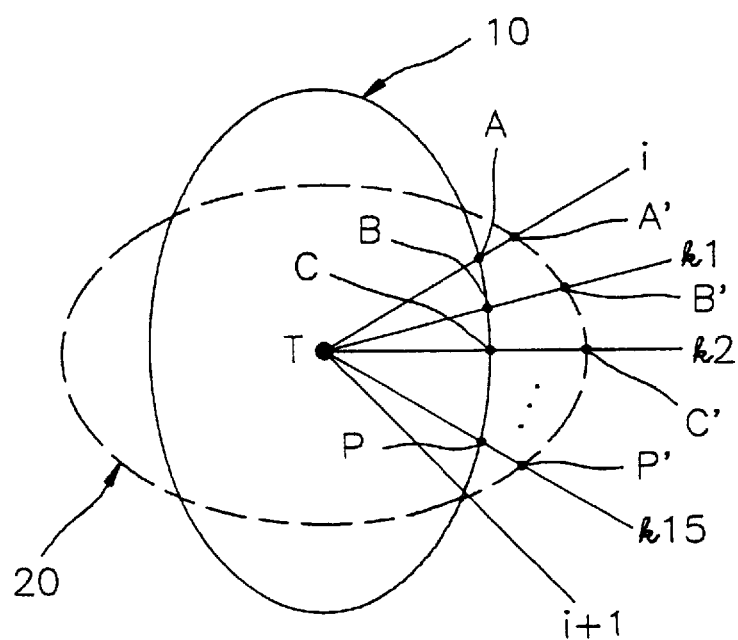
FIG. 5 depicts an inter-coding process carried out at the inter-coding block.

The matching sector 141 overlaps the current contour and the predicted current contour as shown in FIG. 5 to thereby provide an overlapped contour to the deviation detection sector 142.

The deviation detection sector 142 detects, in accordance with the present invention, the difference between the current contour and the predicted current contour based on the overlapped contour.

Referring to FIG. 5, there is shown an illustrative diagram describing a deviation detection process. The deviation detection process for the current contour and the predicted current contour of a simple, e.g., convex, closed loop is depicted in FIG. 5, wherein the deviation detection sector 142 first draws from a common centroid T a set of M number of radial equiangular primary segmentation lines starting from a predetermined reference segmentation line, the magnitude of the angle between two adjacent primary segmentation lines being $2\pi/M$ radian, M being an integer larger than 1, and then subdivides the angle between every two adjacent primary segmentation lines, e.g., ith and (i+1)st primary segmentation lines, by drawing P-1 number of radial equiangular secondary segmentation lines, e.g., k1 to k15, therebetween, P being a positive integer. Thereafter, the deviation detection sector 142 detects intersection points of the total M×P number of segmentation lines intersecting with the overlapped contour, e.g., as exemplarily shown in FIG. 5, A to P on the current contour 10 and A' to P' on the predicted current contour 20. Once all the intersection points of M×P number of segmentation lines are detected, the deviation detection sector 142 calculates, for instance, starting from the reference segmentation line and moving clockwise, errors at all the intersection points of all the segmentation lines with the current contour, e.g., A, B, C, . . . , and P, wherein each error is calculated by subtracting the distance between the centroid T and an intersection point of each segmentation lines with the current contour, e.g., TA, from the distance between the centroid T and an intersection point of each segmentation line with the predicted current contour, e.g., TA'. After calculating all the errors at all the intersection points on the current contour 10 by using the deviation detection process as described above, the errors are grouped into a set of arrays, each array including P number of errors, as follows:

$$D_1 = [d_1^1, d_2^1, \ldots, d_j^1, \ldots, d_P^1]$$

$$D_2 = [d_1^2, d_2^2, \ldots, d_j^2, \ldots, d_P^2]$$

$$D_I = [d_1^I, d_2^I, \ldots, d_j^I, \ldots, d_P^I]$$

$$D_M = [d_1^M, d_2^M, \ldots, d_j^M, \ldots, d_P^M]$$

wherein $D_I$ represents an Ith array; $d^I_1$, an error for an Ith primary segmentation line; and $d^I_j$, an error for a jth secondary segmentation line between the Ith and (I+1)st primary segmentation lines with I and j ranging from 1 to M and 2 to P, respectively, $d^M_j$ representing an error for a jth primare, i.e., reference, segmentation lines.

In another preferred embodiment of the present invention, the number M of the primary segmentation lines is adjusted adaptively to the size of the overlapped contour. That is, based on distances between the centroid T and the intersection points on the predicted current contour 20, the mean value thereof is calculated for a predetermined M first; and thereafter the number M is adjusted such that M increases as the mean value increases with respect to appropriate predetermined threshold values.

From the deviation detection sector 142, deviation information representing the set of arrays determined by the above process is dispatched to an image signal encoder 143.

The image signal encoder 143 transforms each array included in the deviation information from the deviation detection sector 142 into a set of quantized transform coefficients, e.g., by using a one-dimensional DCT(discrete cosine transform) and any of the known quantization methods. The sets of the quantized transform coefficients are then transmitted therefrom to the multiplexer 144.

At the multiplexer 144, the set of quantized transform coefficients incorporates with the selection information from the mode selection block 100 via the line L30 and the incorporated data is coupled onto a line L60 as inter-coded contour information.

As illustrated above, the operation of the inter-coding block 140 depends on the data coupled thereto via the lines L30 and L40. Accordingly, if neither the selection information from the mode selection block 100 via the line L30 nor the predicted current contour from the motion compensation block 110 through the line L40 is input to the inter-coding block 140, there is no output from the inter-coding block 140.

Referring back to FIG. 1, a selection block 150 and a switch 170 pass the intra-coded contour information or the inter-coded contour information in response to the mode selection signal transferred through the line L20. If the first mode selection signal MS1 is coupled thereto, the inter-coded contour information is selected and transferred to a transmitter(not shown) for the transmission thereof and an inter-decoding block 180A via the switch 170. On the other hand, if the second mode selection signal MS2 is fed thereto, the intra-coded contour information is chosen to be delivered to the transmitter and an intra-decoding block 180B through the switch 170.

The inter-decoding block 180A decodes the inter-coded contour information fed thereto by using, e.g., an inverse quantization and an inverse discrete cosine transform and then provides it as decoded inter contour information to the inter reconstruction block 190A.

Same as at the block 180A, the intra-decoding block 180B processes the intra-coded contour information coupled thereto to thereby supply decoded intra contour information to an intra reconstruction block 190B.

The inter reconstruction block 190A produces reconstructed contour information based on the predicted current contour input through the line L40 and the decoded inter contour information from the inter-decoding block 180A, wherein the reconstructed contour information includes reconstructed contour image data and index data thereof. The reconstructed contour information is stored as new previous contour information in the contour storage memory 120, wherein the new previous contour information is stored together with other previous contour information, if exists, already stored in the contour storage block 120 prior to the new previous contour information.

The intra reconstruction block 190B generates reconstructed contour information based on the decoded intra contour information from the intra-decoding block 180B and supplies it to the contour storage block 120 as new previous contour information as described above.

Consequently, as depicted above, the contour storage block 120 stores an output from the inter reconstruction block 190A or the intra reconstruction block 190B because the inter and the intra reconstruction blocks 190A and 190B selectively operate.

Once all contour image data included in the video frame signal are coded through the use of the above contour coding process, a new video frame signal is fed to the contour detection block 160 and coded as shown above.

The above contour coding method can be adopted to a contour coding process between two video frame signals, i.e., a current frame signal and a previous frame signal.

While the present invention has been described with respect to certain preferred embodiments only, other modifications and variations may be made without departing from the spirit and scope of the present invention as set forth in the following claims.

What is claimed is:

1. A method for encoding a video frame signal containing a plurality of contours on a contour-by-contour basis, each contour being represented by contour image data depicting positions of contour pixels constituting the contour, which comprises the steps of:

(a) assigning index data to each of the contours according to a processing order thereof;
  (b) providing current contour information representing contour image data and index data of a current contour;
  (c) supplying previous contour information representing contour image data and index data of each of previous contours processed prior to the current contour;
  (d) producing selection information and a first or a second mode selection signal by comparing the current contour with said each of the previous contours based on the current contour information and the previous contour information on all of the previous contours, wherein the selection information contains information on a contour selected from the previous contours based on the comparison result;
  (e) inter-coding, in response to the first mode selection signal, the current contour information based on the selection information;
  (f) intra-coding, in response to the second mode selection signal, the current contour information; and
  (g) rendering the inter-coded contour information or the intra-coded contour information as coded contour information to be transmitted.

2. The method according to claim 1, wherein the step (d) includes the steps of:

(d1) assigning one of the previous contours as a target previous contour;

(d2) calculating and comparing the length of the current contour with that of the target previous contour to thereby produce a comparison signal;

(d3) computing, in response to the comparison signal, a candidate displacement denoting a spatial displacement between the current contour and the target previous contour;

(d4) producing a predicted contour for the target previous contour by shifting all the contour pixels on the target previous contour by the candidate displacement;

(d5) detecting an optimized contour for the predicted contour, by horizontally and vertically shifting the predicted contour along the current contour by more than one-pixel, wherein the optimized contour entails a smallest error value representing a difference between the optimized contour and the current contour, to thereby produce the error value for the optimized contour and an optimized displacement determined by adding the candidate displacement to a spatial displacement between the optimized contour and the current contour;

(d6) repeating the steps (d1) to (d5) for all of the remaining previous contours;

(d7) comparing the error values of the optimized contours for all of the previous contours with each other to thereby detect one of the optimized contours as an optimum previous contour which entails a smallest error value;

(d8) comparing the error value for the optimum previous contour with a predetermined threshold value to thereby produce the first or the second mode selection signal; and (d9) supplying, based on the first mode selection signal, the optimized displacement and the index data of the optimum previous contour as the selection information.

3. The method according to claim 2, wherein the comparison signal is generated if a difference between the length of the current contour and that of the previous contour is within a predetermined range of the length of the current contour.

4. The method according to claim 3, wherein the first mode selection signal is generated if the error value of the optimum previous contour is equal to or smaller than the predetermined threshold value and, if otherwise, the second mode selection signal is created.

5. The method according to claim 2, wherein the error value of the optimized contour is defined as the area of non-overlapped regions between the current contour and the optimized contour.

6. The method according to claim 2, wherein the error value of the optimized contour is represented by the number of pixels residing at the non-overlapped regions between the current contour and the optimized contour.

7. The method according to claim 2, wherein, in order to determine the error value of the optimized contour, the step (d5) includes the steps of:

(d51) drawing from a centroid of the current contour a set of K number of radial equiangular lines starting from a predetermined reference line, K being a positive integer, wherein the centroid of the current contour is determined by averaging the position coordinates of all the contour pixels on the current contour;

(d52) detecting intersection points of the K number of radial lines intersecting with the optimized contour and the current contour; and (d53) calculating a sum of absolute values of displacements between the intersection points on each of the radial lines as the error value.

8. An apparatus for encoding a video frame signal containing a plurality of contours on a contour-by-contour basis, each contour being represented by contour image data depicting positions of contour pixels constituting the contour, which comprises:

designation means for indexing each of the contours according to a processing order thereof to thereby grant index data to said each of the contours;

first providing means for providing current contour information representing contour image data and index data of a current contour;

second providing means for storing and sequentially supplying previous contour information representing contour image data and index data of each of previous contours processed prior to the current contour;

mode selection means for producing selection information and a mode selection signal by comparing the current contour with said each of the previous contours based on the current contour information and the previous contour information on all of the previous contours, wherein the selection information contains information on a contour selected from the previous contours based on the comparison result;

inter-coding means for inter-coding the current contour information based on the selection information to thereby generate inter-coded contour information;

intra-coding means for intra-coding the current contour information to thereby produce intra-coded contour information; and selecting means for selecting, in response to the mode selection signal, the intercoded contour information or the intra-coded contour information as coded contour information to be transmitted.

9. The apparatus as recited in claim 8, wherein the mode selection means includes:

means for calculating and comparing, for said each of the previous contours, the length of the current contour with that of the previous contour to thereby produce a comparison signal;

means for computing, for said each of the previous contours, in response to the comparison signal, a candidate displacement denoting a spatial displacement between the current contour and the previous contour;

means for producing, for said each of the previous contours, a predicted contour by shifting all the contour pixels on the previous contour by the candidate displacement;

means for detecting, for the predicted contour corresponding to said each of the previous contours, an optimized contour by horizontally and vertically shifting the predicted contour along the current contour by more than one pixel, wherein the optimized contour entails a smallest error value representing a difference between the optimized contour and the current contour, to thereby produce the error value for the optimized contour and an optimized displacement determined by adding the candidate displacement to a spatial displacement between the optimized contour and the current contour;

means for comparing the error value of the optimized contour corresponding to said each of the previous contours with each other to thereby detect one of the optimized contours as an optimum previous contour which entails a smallest error value;

means for comparing the error value for the optimum previous contour with a predetermined threshold value to thereby produce the mode selection signal; and means for supplying, in response to the mode selection signal, the optimized displacement and the index data of the optimum previous contour as the selection information.

10. The apparatus as recited in claim 9, wherein the comparison signal is generated if a difference between the length of the current contour and that of the previous contour is within a predetermined range of the length of the current contour.

11. The apparatus as recited in claim 9, wherein the mode selection signal is created if the error value of the optimum previous contour is equal to or smaller than the predetermined threshold value.

12. The apparatus as recited in claim 9, wherein the error value of the optimized contour is defined as the area of non-overlapped regions between the current contour and the optimized contour.

13. The apparatus as recited in claim 9, wherein the error value of the optimized contour is represented by the number of pixels residing at the non-overlapped regions between the current contour and the optimized contour.

14. The apparatus as recited in claim 9, wherein, in order to produce the error value of the optimized contour, the detecting means includes:

means for drawing from a centroid of the current contour a set of K number of radial equiangular lines starting from a predetermined reference line, K being a positive integer, wherein the centroid of the current contour is determined by averaging the position coordinates of all the contour pixels on the current contour;

means for detecting intersection points of the K number of radial lines intersecting with the optimized contour and the current contour; and means for calculating a sum of absolute values of displacements between the intersection points on each of the radial lines as the error value.

15. The apparatus as recited in claim 8, wherein the intercoding means includes:

means for producing a predicted current contour based on the previous contour information for all of the previous contours and the selection information, wherein a previous contour whose index data is identical to the index data of the selection information is selected to generate the predicted current contour;

means for overlapping the predicted current contour and the current contour to thereby generate an overlapped contour;

means for detecting deviation information representing the shape difference between the predicted current contour and the current contour based on the overlapped contour;

means for transforming the deviation information; and means for incorporating the transformed deviation information with the selection information as inter-coded contour information.

16. The apparatus as recited in claim 15, wherein the deviation information detecting means includes:

means for drawing a plural number of radial segmentation lines from the centroid of the current contour;

means for detecting a current contour intersection point and a predicted current contour intersection point for each segmentation line, said each segmentation line intersecting with the current contour and the predicted current contour at the current contour and the predicted current contour intersection points, respectively; and means for calculating an error at the current contour intersection point based on a difference between the intersection points of each segmentation line, thereby generating the deviation information.

17. The apparatus as recited in claim 16, wherein the error is determined by subtracting a distance between the centroid of the current contour and the current contour intersection point from a distance between the centroid of the current contour and the predicted current contour intersection point.

18. A method for encoding a video frame signal containing a plurality of contours on a contour-by-contour basis, each contour being represented by contour image data depicting positions of contour pixels constituting the contour, which comprises the steps of:

(a) providing current contour information representing contour image data of a current contour;

(b) retrieving previous contour information representing contour image data for each of a plurality of previous contours processed prior to the current contour;

(c) comparing the current contour to each of said plurality of previous contours to thereby produce selection information and one of a first and a second mode selection signal, said selection information including information on a contour selected from said plurality of previous contours;

(d) inter-coding, in response to the first mode selection signal, the current contour information based on the selection information;

(e) intra-coding, in response to the second mode selection signal, the current contour information; and (f) rendering the inter-coded contour information or the intra-coded contour information as coded contour information to be transmitted.

19. The method of claim 18, wherein said step (c) includes the steps of comparing a length of the current contour with a length of each of said plurality of previous contours to thereby form a corresponding plurality of length differences;

calculating an error value reflective of a shape difference between said current contour and each of a first number of said plurality of previous contours, said first number of said plurality of previous contours comprising those previous contours having a corresponding length difference which is within a predetermined ratio of a length of said current contour;

determining as an optimum previous contour, the previous contour having a smallest error value; and selecting said optimum previous contour for said selection information, if said smallest error value is less than a predetermined threshold.

20. The method of claim 19, wherein said error value is defined as one of the area of non-overlapped regions, and the number of non-overlapped pixels, between the current contour and a previous contour.

* * * * *